Figure 1:
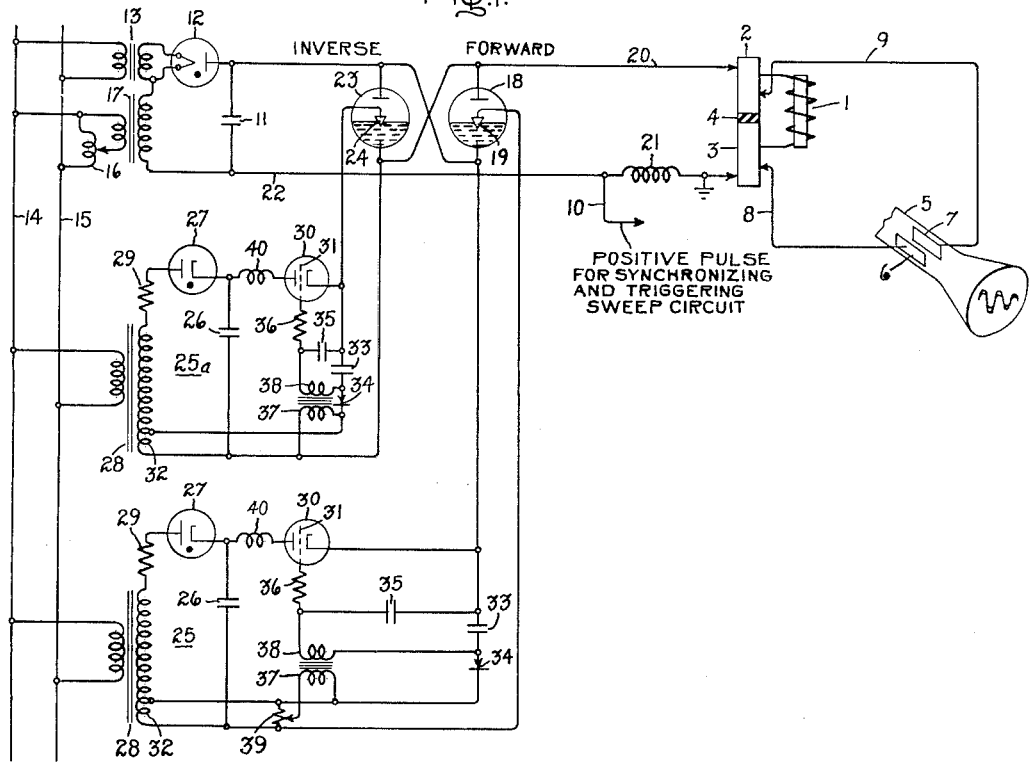

Dec. 27, 1955   N. ROHATS   2,728,886
ELECTRIC CONTROL CIRCUIT
Filed Aug. 31, 1951

Inventor:
Nickolas Rohats,
by Paul A. Frank
His Attorney.

United States Patent Office 2,728,886
Patented Dec. 27, 1955

2,728,886

ELECTRIC CONTROL CIRCUIT

Nicholas Rohats, Scotia, N. Y., assignor to General Electric Company, a corporation of New York Application August 31, 1951, Serial No. 244,594

9 Claims. (Cl. 321—8)

This invention relates to electric control circuits and more particularly to a circuit for controlling the energization of a plurality of electric devices such as electric valves, for example, for testing electrical insulation.

My Patent 2,321,424 granted June 8, 1943, and assigned to the assignee of this invention, discloses and claims a method of testing insulation which is particularly adaptable for testing the turn-to-turn, coil-to-coil, and winding-to-ground insulation of electrical windings. Generally, this method comprises the passing of an electric current through a test piece such as an armature winding of a direct current generator or motor and simultaneously observing the wave shape of voltage across such test piece by means of an oscilloscope. The wave shape of voltage together with the disposition of the wave are indicative of the condition of the insulation of the test piece.

This invention is an improvement upon that disclosed in the above-mentioned patent and is particularly adaptable for testing pieces which are characterized by a very low value of reactance.

When test pieces having very low values of reactance are to be tested, it is necessary to supply a current of high magnitude or high rate of change in order that a voltage will appear in the test winding which is sufficiently high and otherwise is adaptable for observation as by means of an oscilloscope, for example. In order to accommodate high currents for testing the insulation of low reactance test pieces, it is necessary to use electric valve means which is inherently capable of conducting and controlling such high magnitudes of current. One such device which is suitable for this purpose is an electric valve of the ionizable medium type, having a make-alive cathode and commonly known in the art as the ignitron. Ignitron valves, as is well known, are provided with a make-alive element commonly known as an ignitor which element is immersed in a mercury pool cathode. When electric energy is supplied to the ignitor element, the mercury cathode is vaporized to some extent and an ionized condition is thereby established within the tube envelope. Ignitron valves inherently are not adaptable to being precisely timed.

Generally speaking with respect to insulation testing, a suitable energy storage device is charged with electric energy and subsequently is discharged through an electric valve, such as an ignitron operating in a forward direction to conduct electric energy through a test piece. The voltage induced in the test piece, in the form of a counter-electromotive force, effectively causes a reverse current to flow from the energy storage means through the test piece and through an inversely connected ignitron to the energy storage means.

Since electric valves of the ignitron type are inherently subject to variations in the time at which such valves become operably energized, it is desirable to cause the so-called inverse valve to be ionized before the forward valve is ionized. In this way, the oscillation of current through the test piece may be accomplished without interruption or interference.

According to this invention, means are provided for supplying a negative bias to a control valve used in a circuit to energize the ignitor of both a forward and an inverse valve. These control valves are rendered conductive by means of an alternating current bias superimposed on a negative bias supplied to the control grids of each of the control valves. Since the alternating current bias supplied to one of the control valves, such as is used in conjunction with the inverse ignitron, is greater in magnitude than the alternating current bias supplied to the grid of the other control valve, such as is used in conjunction with the forward ignitron, the negative bias of the grid of said one control valve is overcome a short time before the negative bias of the other control valve. For this reason, the control valve associated with the inverse ignitron is operably energized a short time before the forward ignitron is energized thereby insuring that the inverse valve will be in condition to conduct current in ample time.

Figure 2:
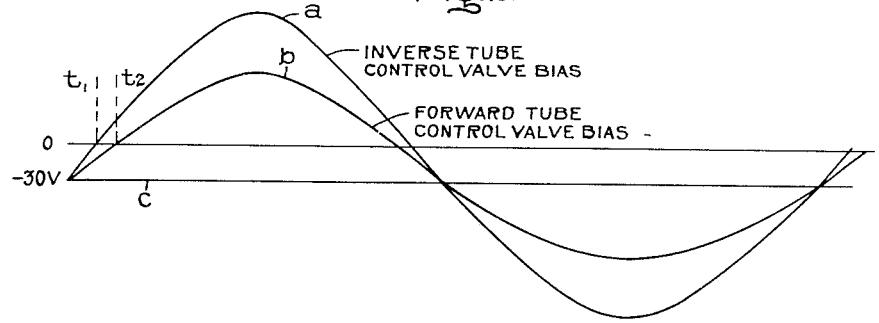
Figure 3:
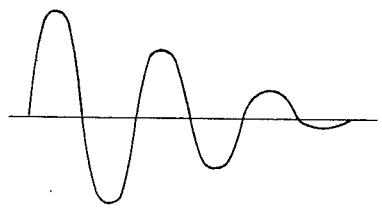

The invention will be better understood from the following detailed description taken in conjunction with the accompanying drawing in which Fig. 1 is a schematic representation of an insulation testing arrangement embodying the invention, in which Fig. 2 is a pair of curves to aid in understanding the principles of the invention, and in which Fig. 3 is a curve representing the shape of the voltage wave appearing across the terminals of the test piece.

In Fig. 1, the numeral 1 represents a winding such as a portion of an armature winding of a direct current generator or motor. The numerals 2 and 3 represent schematically a pair of adjacent commutator bars to which the winding 1 is connected. The numeral 4 schematically represents insulating material disposed between the adjacent commutator bars 2 and 3. The numeral 5 designates a schematically represented oscilloscope having a pair of plates 6 and 7 to which is supplied a signal representative of the voltage across winding 1 by means of the conductors 8 and 9. As is well known, the oscilloscope 5 would be provided with another pair of plates which are not shown, and which would be supplied with a suitable voltage which would provide the sweep energy for the oscilloscope. A positive pulse for synchronizing and triggering the sweep circuit could be supplied from the conductor 10. Since the oscilloscope and its associated circuits form no part of the present invention, the details of such circuits have been omitted for the sake of simplicity. The oscilloscope 5 is connected in known manner, such as is indicated schematically in the above-mentioned Patent 2,321,424. A suitable oscilloscope circuit is shown in more detail at Fig. 3 on page 79 of the March 1951 issue of Railway Mechanical and Electrical Engineer magazine.

Electric current is supplied to the winding 1 from suitable energy storage means such as capacitor 11. Capacitor 11 is charged with its upper plate at a negative potential through a conventional unidirectional conducting device 12. The cathode of device 12 is energized through a transformer 13, the primary winding of which is energized from a suitable source of alternating current as represented by the conductors 14 and 15. An autotransformer 16 is also energized from the conductors 14 and 15 and another transformer 17 is energized from autotransformer 16. Thus, with the upper plate of capacitor 11 charged at a negative potential, electrons will flow through the forward ignitron 18 when that ignitron's ignitor 19 causes ionization of the forward ignitron. Such electrons flow through conductor 20, commutator bar 2, winding 1, commutator bar 3, reactance 21, and conductor 22, to the lower terminal of capacitor 11.

The inverse voltage or counter-electromotive force causes this circuit to oscillate so that electrons would then flow in a reverse direction from the lower plate of capacitor 11 through conductor 22, reactor 21, commutator bar 3, winding 1, commutator 2, conductor 20, and through the inverse ignitron 23 provided its ignitor 24 had caused an ionized condition to be established within the envelope of tube 23.

Since the ignitrons such as 18 and 23 are subject to substantial variations in their times of conduction, which variations are of the order of magnitude of 20 to 60 microseconds, it is desirable to establish an ionized condition within the inverse ignitron 23 before triggering the forward ignitron 18. This is possible since the ignitors 24 and 19 of the ignitrons can be energized for a relatively long time of the order of magnitude of 500 microseconds and since the duration of the test pulse through the test piece comprising the winding 1 is relatively short, in the range of 10 to 100 microseconds. Thus there is adequate time for the test pulse through winding 1 to oscillate a great many times and finally to die out altogether due to losses in the circuit before either the forward or inverse ignitrons becomes deionized. Thus, if the inverse ignitron 23 is ionized a short time before the forward ignitron 18 is triggered, full conduction of the test current will be possible through the ignitrons. To this end, the firing circuit for the forward ignitron generally designated by the numeral 25 is arranged to establish ionization and thereby to trigger the forward ignitron 18 a short time after ionization is established within the inverse ignitron by means of the firing circuit generally designated by the numeral 25a. Since firing circuits 25 and 25a are substantially identical, the same reference numerals are used in conjunction with both these firing circuits insofar as the components are identical. Energy for firing the ignitors 19 and 24 is accumulated on energy storage means such as capacitors 26 through a conventional diode rectifier 27 and transformer 28 energized from the source of alternating current indicated by the conductors 14 and 15. A current limiting resistor 29 is included in the circuit. With this arrangement, the upper plate of capacitors 26 will become positively charged. The discharge of current from a capacitor 26 is controlled by control valve 30 which is provided with a control element 31. Control element 31 is maintained at a negative bias with respect to its cathode by means of a portion 32 of the secondary winding of transformer 28 which in turn energizes the grid biasing capacitor 33 in such a way that its lower plate is negative with respect to the cathode of control valves 30 due to the action of unidirectional conducting device 34. A capacitor 35 effectively aids in stabilizing the grid 31. As is indicated in the drawing, a current limiting resistor 36 is included in the control circuit for electrode 31.

For the purpose of supplying a positive operating potential to the control electrode 31, a transformer having a primary winding 37 and a secondary winding 38 is used. It will be observed that the firing circuit 25a is arranged so that the transformer primary winding 37 is connected directly across the portion 32 of the secondary winding of transformer 28, while the winding 37 of firing circuit 25 is connected across a voltage divider 39 in such a way that the magnitude of voltage supplied to the winding 37 of circuit 25 is substantially less than the magnitude of voltage supplied to the winding 37 of the firing circuit 25a.

The reactor 40 in firing circuits 25 and 25a is for the purpose of prolonging the discharge of the capacitor 26 through the control valve 30, and also serves to limit the magnitude of current supplied by this means to each of the ignitors 19 and 24.

In Fig. 2, the curves $a$ and $b$ represent the respective alternating current voltages supplied to the control electrodes 31 of firing circuits 25a and 25. Also indicated in Fig. 2 is a zero or base line of potential and, in addition, a direct current bias line $c$, which as indicated on the drawing is of the order of magnitude of −30 volts. From Fig. 2, it will be understood that curve $a$, being larger in magnitude than curve $b$, will approach an instantaneous value in the positive direction which is equal and opposite to the negative bias supplied to the grid 31 of firing circuit 25a at the time indicated $t_1$. At a subsequent time indicated at $t_2$, the positive voltage of curve $b$ will be adequate to overcome the negative bias supplied to the control electrode 31 of firing circuit 25. On the assumption that the forward and inverse ignitrons will be rendered conductive at the instant when the negative bias is removed from control electrodes 31 of control valves 30, the inverse valve 23 will be ionized at a time indicated by $t_1$ while the forward ignitron 18 will be ionized and hence triggered at a subsequent time indicated by $t_2$. Ordinarily, the time between $t_1$ and $t_2$ is of the order of magnitude of approximately 50 microseconds. Since the variation in the time of firing of ignitrons extends over a range of 20 to 60 microseconds, and since a short time is required for a pulse from capacitor 11 through the forward ignitron to be returned through the inverse ignitron, I have found that the 50 microseconds elapsing between times $t_1$ and $t_2$ is sufficient to cause proper operation and oscillation of the flow of current through the test piece, such as 1.

The curve of Fig. 3 is representative of the oscillation which is established by the conduction between capacitor 11, the inverse and forward ignitrons, and the test piece 1. It will be understood that this oscillation dies out after a few cycles although it may persist for as much as 6 or 7 complete cycles. It will also be understood that the curve of Fig. 3 is not drawn to the same time scale as is the curve of Fig. 2. The total time depicted in Fig. 3 would of course be but a small part of one half cycle of the wave depicted in Fig. 2.

While I have shown the invention as applied to an insulation testing means for a direct current machine armature, it will be understood that the invention is also applicable among other things to insulation testing for the coils of large alternating current machines. Furthermore, it will be understood that the principles of my improved electric control circuit whereby the precise order of firing of electric devices, such as ignitrons 23 and 18 is accomplished, is not necessarily limited to insulation testing procedures but could have other applications as well. For example, the timing arrangement could be applied to an electric ignitron contactor of the type disclosed in United States Patent 2,517,129—Mulhern, granted August 1, 1950, and assigned to the assignee of this invention.

While I have shown and described a particular embodiment of the invention, I do not wish to be limited thereto and intend in the appended claims to cover all such changes and modifications as fall within the true spirit and scope of the invention.

What I claim as new and desire to secure by Letters Patent of the United States is:

1. In combination, a pair of electric valves each having a control element, means interconnected with each of said elements and including a bias capacitor, unidirectional conducting means, a source of alternating current electric energy for supplying a negative bias to said elements, means including a pair of transformers, each being energized with alternating current and each having an output winding interconnected with one of said elements so as to supply alternating current potential thereto, and means for controlling the magnitude of voltage supplied to at least one of said transformers so that the instantaneous values of voltage supplied by one of said output windings are greater than the corresponding values of instantaneous voltage supplied by the other of said output windings, the voltage of said output windings being substantially in phase with each other.

2. In apparatus for testing electrical insulation and having input terminals adapted for connection to a source of alternating current and output terminals adapted for connection to a load device under test, the combination which comprises a unidirectionally conductive device connected for energization from said input terminals to supply a half-cycle rectified current, an energy storage device connected in circuit with said unidirectionally conductive device whereby energy is stored in said energy storage device during the conductive half-cycles of said unidirectionally conductive device, a pair of oppositely connected electric valves interposed between said energy storage device and said output terminals, each of said electric valves having a control element for rendering the respective electric valves conductive in response to control voltages, control voltage supplying means connected to the control element of one of said electric valves for rendering said one electric valve conductive at a predetermined time during the non-conductive half-cycles of said unidirectionally conductive device, and control voltage supplying means connected to the control element of the other of said electric valves for rendering said other electric valve conductive at a time later than said predetermined time but also during corresponding non-conductive half-cycles of said unidirectionally conductive device, whereby energy is delivered between said energy storage device and said output terminals.

3. In apparatus for testing electrical insulation and having input terminals adapted for connection to a source of alternating current and output terminals adapted for connection to a load device under test, the combination which comprises a unidirectionally conductive device connected for energization from the input terminals to supply a half-cycle rectified current, an energy storage device connected in circuit with said unidirectionally conductive device for storing energy during the conductive half-cycles of said unidirectionally conductive device, a pair of oppositely connected electric valves interposed between said energy storage device and the output terminals, one of said pair of electric valves being connected to conduct current in the forward direction from said energy storage device to the output terminals and the other of said pair of electric valves being connected to conduct current in the inverse direction from the output terminals to said energy storage device, each of said electric valves having a control element for rendering the respective electric valves conductive in response to control voltages, control voltage supplying means connected to said control element of said forward direction conducting electric valve and operative to render said forward direction conducting electric valve conductive at a predetermined time in the non-conductive half-cycles of said unidirectionally conductive device, and control voltage supplying means connected to said control element of said inverse direction conducting electric valve and operative to render said inverse direction conducting electric valve conductive at a predetermined time later than said first-mentioned predetermined time but also during corresponding non-conductive half-cycles of said unidirectionally conductive device, whereby energy may be delivered between said energy storage device and said output terminals.

4. A combination as in claim 3 in which both of said control voltage supplying means comprise a pair of control devices, means connecting the discharge paths of each of said control devices to one of said control elements, each of said control devices having a control electrode supplied with substantially equal negative direct bias voltages, and means for supplying an alternating current potential to each of said control electrodes, the alternating current potentials being substantially in phase with each other and the magnitude of the instantaneous values of the alternating current potential supplied to said control electrode of said control device connected to said forward conducting electric valve being smaller than the corresponding instantaneous values of the alternating current potential supplied to said inverse conducting electric valve.

5. In appparatus for testing electrical insulation and having input terminals adapted for connection to a source of alternating current and output terminals adapted for connection to a load device under test; the combination which comprises a unidirectionally conductive device connected for energization from the input terminals to supply a half-cycle rectified current; an energy storage device connected in circuit with said unidirectionally conductive device for storing energy during the conductive half-cycles of said unidirectionally conductive device; a pair of oppositely connected electric valves interposed between said energy storage device and the output terminals, each of said electric valves having a control element for rendering the respective electric valves conductive in response to control voltages; and means for supplying control voltages to said control elements of said electric valves including a pair of control valves each having its discharge path connected to the control element of one of said electric valves and each having a control electrode, means for supplying substantially equal direct bias voltages to said control electrodes of said control valves, and means for supplying alternating bias voltages of substantially the same time phase but of different magnitudes to said control electrodes, the time phase of said alternating voltages having a predetermined relationship with respect to the conduction and non-conduction of said unidirectionally conductive device to cause both said control valves to conduct during the non-conductive half-cycles of said unidirectionally conductive device; whereby both of said electric valves are rendered conductive during the non-conductive half-cycles of said unidirectionally conductive device to permit current to be delivered to a load device.

6. An electric control circuit, comprising: a series circuit adapted to be connected across a load and including electrical energy storage means and a pair of normally non-conductive oppositely connected electric valves connected thereto for allowing current to flow to and from said storage means when said valve are rendered conductive by control voltages; means receptive of alternating current electrical energy for supplying energy to said storage means during alternate half cycles of the energy applied thereto; first means for causing one of said electric valves to conduct during the alternate half cycles when energy is not being supplied to said storage means for discharging said storage means through said load; and second means for causing the other of said electric valves to conduct during the same half cycle when the one valve is conducting but prior to the time of conduction of said one valve for conducting current to said storage means through said load.

7. A circuit as in claim 6 wherein said first and second means each applies an alternating current control voltage to a respective one of said electric valves, the control voltage from said first means being in phase with that from said second means but having a lesser amplitude.

8. A circuit as in claim 7, wherein said pair of electric valves are ignitrons each having respectively an ignitor electrode therein, said first and second means being connected respectively to a respective one of the ignitor electrodes.

9. A circuit as in claim 8 wherein said ignitrons have equal biases upon the ignitor elements thereof, and said first and second means include respectively first and second transformers for applying in phase voltages of unequal amplitude to said ignitor elements so as to overcome said biases.

References Cited in the file of this patent

UNITED STATES PATENTS

| 2,169,023 | Dawson | Aug. 8, 1939 |
| 2,534,909 | Hooper | Dec. 19, 1950 |
| 2,564,500 | Poole | Aug. 14, 1951 |
| 2,604,612 | Rudolph | July 22, 1952 |